March 5, 1940.　　　　N. L. ETTEN　　　　2,192,401
SAFETY RELEASE MECHANISM
Filed May 25, 1933　　　3 Sheets-Sheet 1
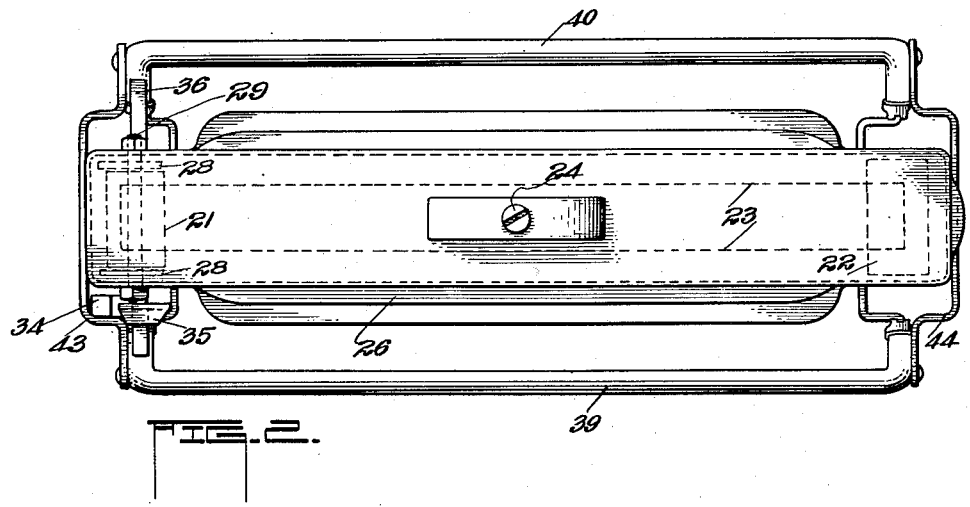
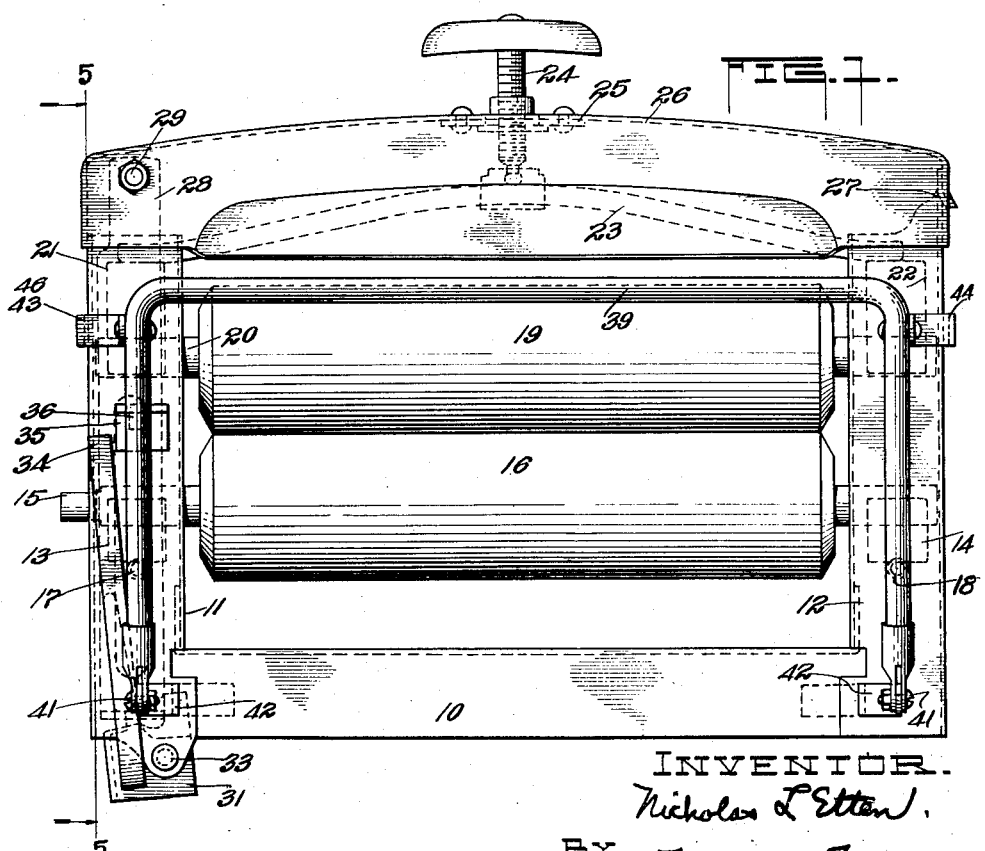

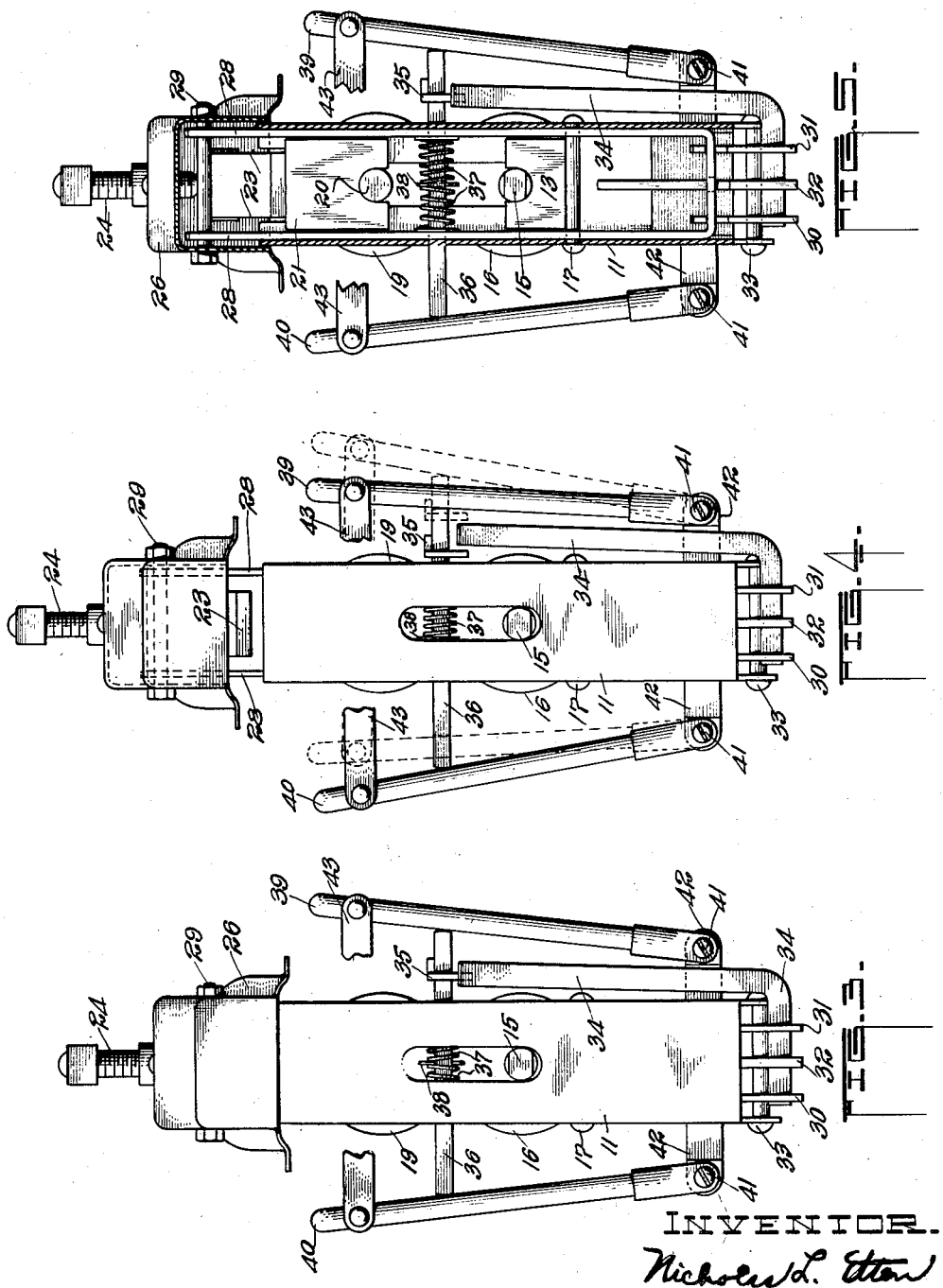

March 5, 1940.  N. L. ETTEN  2,192,401
SAFETY RELEASE MECHANISM
Filed May 25, 1933   3 Sheets-Sheet 3
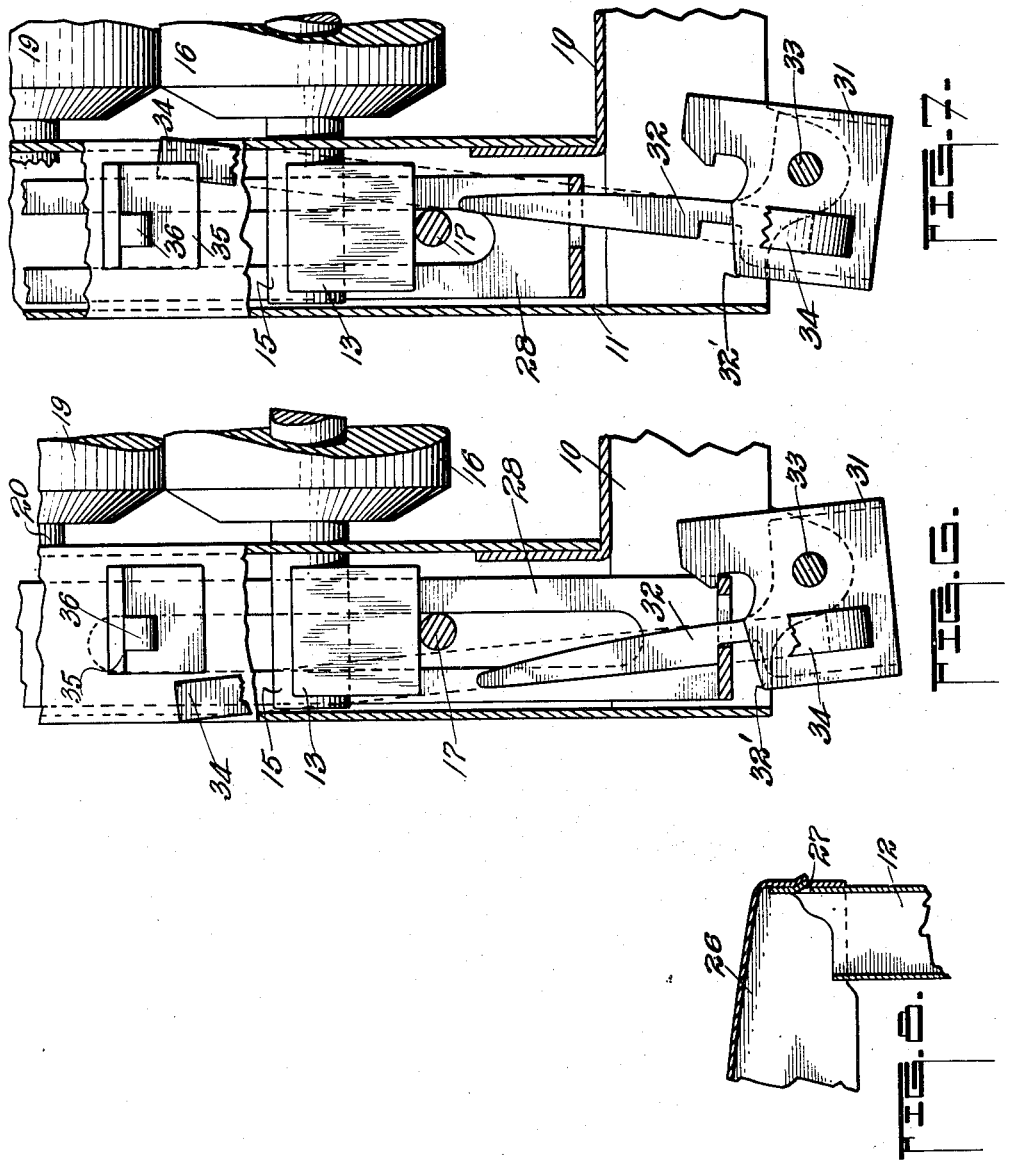

Patented Mar. 5, 1940

2,192,401

UNITED STATES PATENT OFFICE 2,192,401

SAFETY RELEASE MECHANISM

Nicholas L. Etten, Waterloo, Iowa, assignor to Chamberlain Corporation, Waterloo, Iowa Application May 25, 1933, Serial No. 672,760

4 Claims. (Cl. 68—263)

This invention relates to safety release mechanism for power driven roll wringers.

The main object of the invention is to provide a mechanism to be associated with a roll wringer for the purpose of relieving the contact pressure between the rolls.

Another object is to provide a release means which is simple in form and function.

A further object is to provide a safety release means which may be efficiently operated by inexperienced persons.

Still another object is to provide safety release means which may be conveniently operated from any point about the wringer.

The invention is clearly exposed in the following description and accompanying drawings, in which—

Fig. 1 is a side elevational view of a wringer with releasing devices attached;

Fig. 2 is a plan view of the same;

Fig. 3 is an end elevational view of the assembly as the same might be viewed from the left of Fig. 1;

Fig. 4 is an end elevational view similar to Fig. 3 showing several members in operated position;

Fig. 5 is a view similar to Figs. 3 and 4 with certain parts broken away or removed to expose underlying parts, as the same might be viewed from line 5—5 in Fig. 1;

Fig. 6 is an enlarged fragmentary sectional view showing details of certain of the releasing mechanism, parts to be described showing same in locked position;

Fig. 7 is a view similar to Fig. 6 showing the locking parts in released position;

Fig. 8 is a fragmentary detail sectional view showing retaining means to be described.

Fig. 1 discloses a wringer frame and mechanism generally composed of a U-shaped frame comprising a lower transverse member 10 from each end of which upright members 11 and 12 extend as shown. Uprights 11 and 12 have a hollow cross section and are adapted to support and house bearing blocks 13 and 14 which are adapted to rotatably support the ends of a shaft 15 carrying a wringer roll 16. Blocks 13 and 14 are rockably supported within the uprights 13 and 14 by means of pins 17 and 18, as shown.

The upper wringer roll 19 is mounted upon a shaft 20, each end of which is rotatably mounted in inverted bearing blocks 21 and 22 which are slidably mounted within the uprights 11 and 12. Seated upon bearing blocks 21 and 22 are the two extremities of a flat spring member 23 which is abutted at its center by a handled screw 24 threadedly mounted in a bearing member 25 which is affixed to a transverse frame member 26.

Frame member 26 is adapted to receive, at either end, the upper ends of uprights 11 and 12, the right hand end, as in Fig. 1, being retained upon the upper end of upright 12 by a lip 27 which is formed in the body of upright 12, as shown in detailed section in Fig. 8.

As best shown in Fig. 5, the left hand end of frame member 26 is retained in place upon the upper end of upright 11 by means of a U-shaped link member 28, the upper ends of the leg portions of said link being pivotally attached to member 26 by means of a bolt 29. Link 28 is adapted to slide within the upright 11, suitable slots being provided in the leg portions to clear the several members which are transversely mounted in the upright.

As best shown in Figs. 5 and 6, the lower or connecting portion of link 28 is adapted to be engaged and retained by three hook members 30, 31 and 32, all of which are suitably spaced as shown with hooks 30 and 31 disposed toward either side of hook 32, and pivotally supported in downwardly depending extension portions of the lower transverse frame member 10 by means of a pin 33.

Hook members 30 and 31 are adapted to engage the inner edge of link 28. Hook 32 has an upwardly extending finger portion as shown, and is disposed and adapted to engage an inner edge of an opening formed in the lower connecting portion of link 28.

The foregoing will illustrate that the upper frame member 26 is retained in normal working position at one end by the lip 27 and at the other end by hooks 30, 31 and 32 through the link 28. Obviously, the spring 23, abutting the bearing blocks 21 and 22 and abutted by the screw 24 mounted in frame member 26, will react to press downwardly upon the sliding bearing blocks 21 and 22 and thus furnish suitable contact pressure between the rolls 16 and 19.

Figs. 1, 5 and 6 will disclose an angulated lever member 34 having a square cross section, the lower horizontal portion joining hooks 30, 31 and 32, the lever portion extending upwardly and adapted to rest against an abutment member 35 which is affixed to a horizontally disposed bar member 36, as shown.

Bar member 36 is of square cross section and is slidably mounted in the side portions of upright 11, it is yieldably retained approximately centrally with relation to upright 11 by two opposing springs 37 abutting the sides of upright 11, and a pin 38 affixed in the bar as shown best in Fig. 5.

It will be noted that abutment member 35 is so disposed upon bar 36 that when the bar is centrally positioned as described, the said abutment member is positioned to obstruct movement of the upper end of lever 34, also that spring 23, reacting between bearing blocks 21 and frame member 26 as described, tends to force escapement of link 28 from retaining hooks 30, 31 and 32, such escapement being prevented by lever 34 as obstructed by abutment member 35.

Obviously, with the several parts suitably adjusted with relation to each other and positioned as shown in Figs. 5 and 6, hooks 30, 31 and 32 may be held in retaining engagement with link 28 by lever 34 resting upon abutment member 35. If, however, bar 36 is moved in either direction to remove abutment member 35 from the central or obstructing position, as shown in Fig. 4, lever 34 may assume the position shown in Fig. 7, allowing link 28 to displace and escape from hooks 30, 31 and 32. This escapement feature will be referred to later.

Figs. 1, 2 and 3 will disclose two angulated hand rails 39 and 40, the transverse portions of which are disposed parallel to the wringer frame, the leg portions being pivotally mounted near the lower ends of frame members 11 and 12 by means of screws 41 in affixed bracket members 42, as shown. Joining the upper portion of hand rails 39 and 40 are pivotally attached link members 43 and 44, the function of which is to maintain parallel alignment as between the hand rails and to impart unitary movement between them when either is manually operated, as will be explained later.

The function of abutment member 35 as positioned upon rod 36 has already been referred to. Fig. 4 will illustrate that links 43 and 44 are adapted to space handrails 39 and 40 to approximately contact the ends of rod 36 in such a manner that the described centralizing action of springs 37 will, through rod 36, normally retain hand rails 39 and 40 in position.

Assuming the several parts to be in normal running position as shown in Figs. 3 and 6, it will be clear that manipulation of either of hand rails 39 or 40 toward the wringer, as shown in dotted lines in Fig. 4, will result in sliding movement of bar 36 to displace abutment member 35 to permit escapement of lever 34, as described, and consequent movement of hooks 30, 31 and 32 to permit escapement of link 28. Obviously, such escapement of link 28 will permit spring 23 to force frame member 26 upwardly which movement will allow relaxation of spring 23 and consequent removal of pressure upon bearing blocks 21 and 22 to relieve contact pressure between rolls 16 and 19. The described upward movement of frame member 26 at the left hand or link carrying end, together with the general disturbance of the parts induced by their sudden release, will result in unhooking of the right hand end of frame member 26 from the lip 27. Thus a slight manipulation of either hand rail 39 or 40 will result in immediate release of pressure between the wringer rolls.

Operation of the mechanism may be summarized as follows:

With parts in normal running position as described and wringer rolls rotating a slight manipulation of hand rails 39 or 40 will simultaneously displace rod 36 to permit release of pressure between the wringer rolls.

It will be noted that link 28 while acting as a retaining means for frame member 26 may, when the said member is in a released position, as shown in Fig. 4, act as a guide or aligning means to expedite reassembly of the several parts into working position. Reassembly of the parts may be quickly accomplished by re-hooking the right hand end of member 26 upon the lip 27 and pushing the left hand end downwardly toward upright 11. This movement will result in contact of the lower portion of link 28 with the shouldered portions 32' of hooks 30 and 31 causing hooks 30, 31 and 32 to rotate into locking position as shown in Fig. 6. The upwardly extending portion of hook 32 is loosely retained in the opening in link 28 and is adapted to act as a guide or retaining means to hold the hooking mechanism in suitable working relation with link 28.

The described rotation of hooks 30, 31 and 32 into locking position results in corresponding movement of lever 34 out of engagement with abutment member 35 which movement permits springs 37 to restore rod 36 together with hand rails 39 and 40 to normal working position.

What I claim is:

1. A wringer of the character described including a frame structure comprising a stationary portion and a removable portion, rollers carried by the stationary portion, roll pressure means carried by the removable frame portion, means for retaining the removable frame portion in position relative to the stationary frame portion to hold the rollers under pressure, said means including a link member carried by the removable frame portion and a hook member carried by the stationary frame portion and adapted to be engaged with the link member, said hook member having a portion cooperating with the link member to form a guide therefor, and means for releasing said hook member from the link member to permit movement of the removable frame portion relative to the stationary frame portion and to release pressure of the rollers.

2. A wringer of the character described including a frame structure comprising a stationary portion and a removable portion, rollers carried by the stationary portion, roll pressure means carried by the removable frame portion, means for retaining the removable frame portion in position relative to the stationary frame portion to hold the rollers under pressure, said means including a link member carried by the removable frame portion and a hook member carried by the stationary frame portion and adapted to be engaged with the link member, said link member having an opening therein and the hook member having an extension operable in the opening of the link member to form a guide for said link member, and means for releasing said hook member from the link member to permit movement of the removable frame portion relative to the stationary frame portion and to release pressure of the rollers.

3. A wringer of the character described including a frame structure comprising a stationary portion and a removable portion, rollers carried by the stationary portion, roll pressure means carried by the removable frame portion, means for retaining the removable frame portion in position relative to the stationary frame portion to hold the rollers under pressure, said means including a link member carried by the removable frame portion and a plurality of hook members carried by the stationary frame portion and adapted to be engaged with the link member, one of said hook members being formed with an extension engageable with the link member to form a guide therefor, and means for releasing said hook members from the link member to permit movement of the removable frame portion relative to the stationary frame portion and to release pressure of the rollers.

4. A wringer of the character described including a frame structure comprising a stationary portion and a removable portion, rollers carried by the stationary portion, roll pressure means carried by the removable frame portion, means for retaining the removable frame portion in position relative to the stationary frame portion to hold the rollers under pressure, said means including a link member carried by the removable frame portion and a plurality of hook members carried by the stationary frame portion and adapted to be engaged with the link member, one of said hook members having an extension engageable with the link member to form a guide therefor while the other of said hook members are formed with a portion adapted to be engaged by the link member for positioning the hook members in engagement with the link member, and means for releasing said hook members from the link member to permit movement of the removable frame portion relative to the stationary frame portion and to release pressure of the rollers.

NICHOLAS L. ETTEN.